United States Patent
Salvatore et al.

[19]

[11] Patent Number: 6,116,545
[45] Date of Patent: Sep. 12, 2000

[54] FREE RETURN LUNAR FLYBY TRANSFER METHOD FOR GEOSYNCHRONOUS SATELLITES

[75] Inventors: Jeremiah O. Salvatore, Redondo Beach; Cesar A. Ocampo, El Segundo, both of Calif.

[73] Assignee: Hughes Electronics Corporation, El Segundo, Calif.

[21] Appl. No.: 09/057,938

[22] Filed: Apr. 9, 1998

[51] Int. Cl.[7] ........................................ B64G 1/10
[52] U.S. Cl. ........................................ 244/158 R
[58] Field of Search ........................ 244/158 R, 172

[56] References Cited

U.S. PATENT DOCUMENTS

| | | | |
|---|---|---|---|
| 5,158,249 | 10/1992 | Upoff | 244/158 R |
| 5,507,454 | 4/1996 | Dulck | 244/158 R |
| 5,511,748 | 4/1996 | Scott | 244/161 |
| 5,716,029 | 2/1998 | Spitzer et al. | 244/158 R |

FOREIGN PATENT DOCUMENTS

| | | |
|---|---|---|
| WO98/33704 | 8/1998 | WIPO . |
| WO98/42570 | 10/1998 | WIPO . |
| WO98/47765 | 10/1998 | WIPO . |

OTHER PUBLICATIONS

Rudolf Meyer, Elements of Space Technology for Aerospace Engineers, Academic Press, pp 61–95, 1999.

"Geostationary Orbits From Mid–Latitude Launch Sites Via Lunar Gravity Assist", Graziani et al., *Spaceflight Dynamics* vol. 84, Part I, 1993, pp. 561–572.

"Use of the Moon's Gravitational Field to Inject a Space Vehicle into a Stationary Earth–Satellite Orbit", Ivashkin et al. *Kosmicheskie Issledovaniya*, vol. 9, No. 2, pp. 163–172, Mar.–Apr. 1971.

Kawaguchi et al., "On Making Use of Lunar and Solar Gravity Assists in Lunar–A, Planet–B Missions," *Acta Astronautica*, vol. 35, No. 9–11, pp. 633–642, 1995.

Belbruno et al., "Sun–Perturbed Earth–to–Moon Transfers with Ballistic Capture," *Journal of Guidance, Control and Dynamics*, vol. 16, No. 4, Jul.–Aug. 1993.

Belbruno et al., "Ballistic Caputure Lunar Transfer Determination for the US Air Force Academy Blue Moon Mission," AAS/AIAA Space Flight Mechanics Meeting, Feb. 10–12, 1997.

*Primary Examiner*—Galen L. Barefoot
*Attorney, Agent, or Firm*—Terje Gudmestad; M. W. Sales

[57] ABSTRACT

A method is provided for using a lunar flyby maneuver to transfer a satellite from a quasi-geosynchronous transfer orbit having a high inclination to a final geosynchronous orbit having a low inclination. The invention may be used to take the inclination of a final geosynchronous orbit of a satellite to zero, resulting in a geostationary orbit, provided that the satellite is launched in March or September.

4 Claims, 2 Drawing Sheets

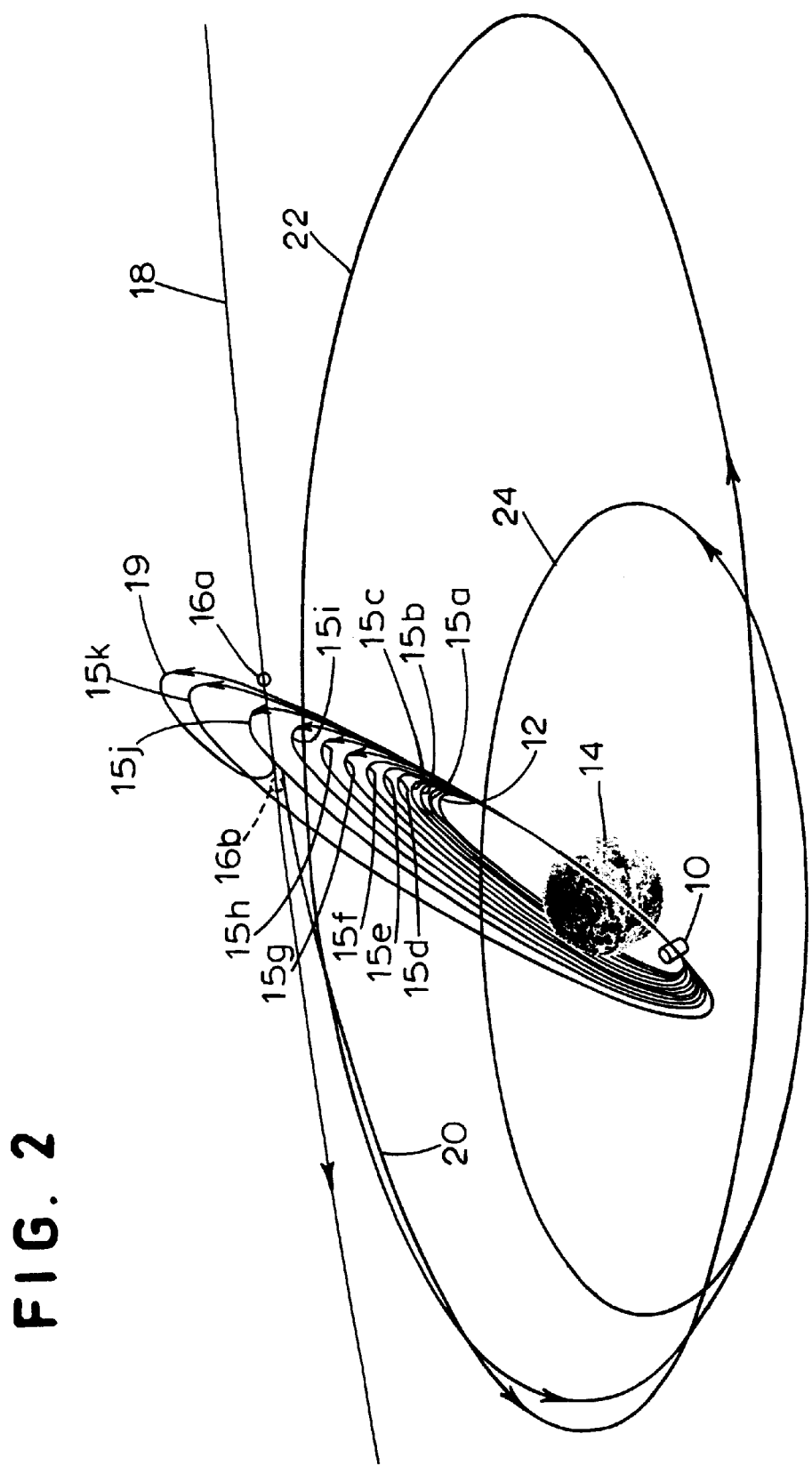

FREE RETURN LUNAR FLYBY TRANSFER METHOD FOR GEOSYNCHRONOUS SATELLITES

BACKGROUND OF THE INVENTION (a) Field of the Invention

The present invention relates generally to a method for orbital transfer using a lunar flyby maneuver, and more particularly, to a method for orbital transfer from a quasi-geosynchronous transfer orbit (quasi-GTO) to a geosynchronous orbit using a ballistic lunar flyby maneuver. As used herein, the term "quasi-GTO" shall be understood to mean an orbit having an apogee altitude near geosynchronous altitude, or higher than geosynchronous altitude.

(b) Description of Related Art

Several general orbit transfer strategies are presently used for placing a spacecraft into a geosynchronous orbit. These methods are based on the classical generalized Hohmann transfer strategies that have been shown to be optimal in the context of the two-body problem. However, by using a restricted three-body problem model such as the earth, moon, spacecraft problem, alternative transfer strategies may be used to take advantage of the non-linear effects of the combined gravitational forces of the moon and the earth to improve the performance of a transfer trajectory from a fuel savings point of view. The present invention is an example of a transfer strategy that can improve such fuel savings performance of a transfer trajectory from a high inclination quasi-GTO to a low inclination, geosynchronous orbit.

Dulck, U.S. Pat. No. 5,507,454 discloses a method for transferring a satellite from a low-inclination orbit to a high-inclination orbit using a lunar gravitational assistance maneuver. The Dulck patent discloses a satellite trajectory that includes a circumlunar orbit having semi-major axis approximately equal to the distance between the earth and the moon, 384,402 km. Thus, the satellite is sent past the moon by a great distance, requiring an extended period of time to complete the maneuver.

A lunar flyby trajectory was flown by the Apollo program. However, the Apollo maneuver was not used to transfer an earth orbit of a spacecraft from a high inclination orbit to a low inclination orbit, but instead was used in order to achieve a direct return path for atmospheric reentry to the earth.

SUMMARY OF THE INVENTION

The invention is directed to a method for transferring a spacecraft from a quasi-GTO to a geosynchronous orbit by using the gravity provided by the moon to achieve a desired inclination by means of a lunar flyby. The lunar flyby helps to means of a lunar flyby. The lunar flyby helps to lower the inclination of the orbit of the satellite, raise the perigee of the orbit of the satellite to geosynchronous altitude, and rotate the ascending node of the orbit of the satellite. The method requires the use of a deterministic injection maneuver at the perigee of the starting orbit to place the spacecraft on a translunar trajectory. The appropriate parameters characterizing a ballistic flyby of the moon are chosen to allow the spacecraft to return to the vicinity of the earth where the perigee point has been raised to geosynchronous radius and the inclination of the trajectory relative to the equator of the earth has been reduced significantly. This is accomplished by timing the lunar flyby to occur at either the descending or ascending node of the orbit of the moon about the earth. If the flyby occurs at either of these nodes, then the minimum inclination that can be achieved is zero, otherwise the minimum inclination that can be achieved is equal to the moon's declination relative to the equatorial plane. An additional deterministic maneuver is made at the return perigee point in order to insert the spacecraft into a geosynchronous orbit. The following detailed description of the invention describes how the lunar flyby parameters are chosen to achieve these post-lunar flyby conditions for a particular satellite, the ASIASAT 3, which will be maneuvered from an initial high inclination orbit (about 51.2 degree inclination) to a final low inclination geosynchronous orbit (about 12 degree inclination), using a method in accordance with the present invention.

The method in accordance with the present invention may be readily visualized as being broken into three distinct stages. In a first stage, the spacecraft is placed in successively higher apogee orbits by a sequence of perigee burns, resulting in a series of intermediate phasing orbits that are used for proper phasing to target a desired intercept trajectory to the lunar perilune point. Of course, for a given satellite mass, a satellite having more powerful engines will require fewer intermediate phasing orbits than a satellite having less powerful engines.

In a second stage, a translunar injection maneuver at perigee is made to escape the final intermediate phasing orbit of the earth. Lunar flyby occurs a few days later (approximately five days later). The spacecraft is then placed in a geosynchronous perigee holding orbit to again orbit the earth.

In the third and final stage, perigee at the earth return is at geosynchronous altitude, at which point a maneuver is made to insert the spacecraft into a large orbit with an orbit period of about four days. The spacecraft continues to a suitable point just past the descending node where an inclination/node maneuver is made to further adjust inclination and node if needed. Finally, the spacecraft continues to perigee where it is inserted into a final geosynchronous orbit.

In accordance with one aspect of the present invention, a method is provided for transferring a satellite from a initial orbit about the earth, the initial orbit having a first inclination, to a final orbit about the earth, the final orbit having a second inclination different from the first inclination, using a lunar gravity-assist flyby maneuver. The method comprises the steps of: placing the satellite into the initial orbit about the earth; placing the satellite into a translunar orbit; placing the satellite into a lunar flyby maneuver near apogee of the translunar orbit, whereby the inclination of the orbit of the satellite with respect to the earth is significantly altered; placing the satellite into an earth-return orbit; and placing the satellite into the final orbit about the earth.

The invention itself, together with further objects and attendant advantages, will be best understood by reference to the following detailed description, taken in conjunction with the accompanying drawing.

BRIEF DESCRIPTION OF THE DRAWING

FIG. 2 is a perspective view of the orbits of FIG. 1.

DESCRIPTION OF THE PREFERRED EMBODIMENT

Figure 1:
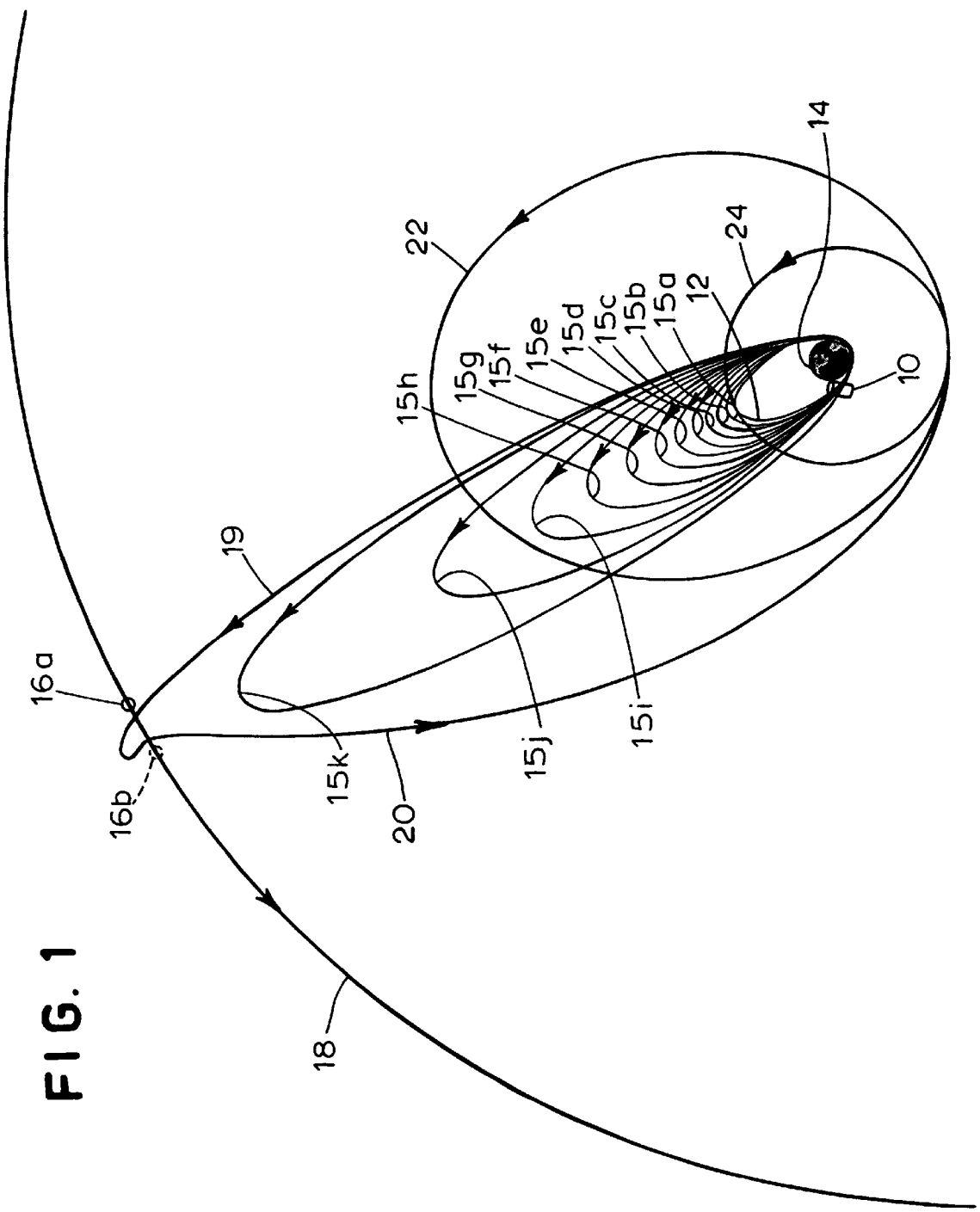
FIG. 1 is a schematic representation of the orbits used in accordance with the present invention.

The invention will now be described in connection with a current application of the inventive method to transfer the orbit of the ASIASAT 3 spacecraft from a highly inclined, highly eccentric quasi-GTO to a geosynchronous orbit with a low inclination. However, the invention is applicable to any satellite for transfer from a relatively highly inclined quasi-GTO (i.e., having an inclination of about 28 degrees or more) to an orbit having a relatively low inclination geosynchronous orbit (i.e., having an inclination of 20 degrees or less).

As illustrated in FIGS. 1 and 2, the ASIASAT 3 satellite, depicted at 10, is initially in an initial orbit 12 about the earth 14. Eleven phasing orbits 15a–k are depicted in FIGS. 1 and 2. The moon is depicted at 16a before the lunar flyby and at 16b after the lunar flyby and the orbit of the moon 16a, 16b about the earth 14 is depicted at 18. A translunar orbit 19 leads from the earth 14 to the moon 16a, 16b, and an earth return orbit 20 leads back to a geosynchronous perigee holding, earth centered orbit 22, having a perigee altitude equal to that of a final, geosynchronous operational orbit 24.

Table I lists the orbital parameters for the initial orbit 12, as well as the mid-burn parameters for phasing orbits 15a–k, translunar orbit 19, earth return orbit 20, geosynchronous perigee holding orbit 22, and final operational orbit 24.

As illustrated in FIGS. 1 and 2, translunar orbit 19 is configured to provide a leading-edge lunar flyby maneuver (i.e., the satellite 10 crosses the path of the orbit of the moon about the earth ahead of the moon). If the satellite 10 had been launched in March or September (around the time of an equinox), the lunar flyby could be timed to occur when the node of the moon is close to the node of the quasi-geosynchronous transfer orbit, so that the earth return orbit has an inclination near zero and the inclination of the orbit of the satellite about the earth could be completely removed by the lunar flyby.

Table I also shows the magnitude of each maneuver used to place the ASIASAT 3 spacecraft into each of the phasing orbits 15, translunar orbit 19, earth return orbit 20, geosynchronous perigee holding orbit 22, and final operational orbit 24. Transfer to each of the eleven phasing orbits 25 is achieved by a seven minute perigee burn that provides an acceleration (thrust) vector aligned with the velocity vector of the satellite 10 at perigee, resulting in a change in velocity ($\Delta V$) ranging from about 55.11 meters per second for the first phasing orbit to a change in velocity of 65.74 meters per second for the eleventh and final phasing orbit. It should be noted that, for proper phasing, the satellite 10 orbits twice in each of the third, sixth, eighth and ninth phasing orbits 15c, 15f, and 15i. To place the spacecraft into the translunar orbit 19 from the eleventh phasing orbit 15k, a relatively short burn of about 96 seconds is used, resulting in a change of velocity of 22.74 meters per second.

The total required change in velocity for placing the spacecraft into the translunar orbit is about 2,234 feet per second, requiring a propellant weight of about 1,496.8 pounds. A duration of about 21.75 days is used to execute the twelve perigee maneuvers used to place the spacecraft into the translunar orbit 19. A total duration from initial orbit 12 to final geosynchronous orbit 24 is about six weeks.

A decelerating burn at perigee of the earth return orbit 20 results in a $\Delta V$ of about 312.4 meters per second in order to transfer the satellite from the earth return orbit 20 to the geosynchronous perigee holding orbit 22. A series of decelerating burns at perigee (with a $\Delta V$ of 828.18 meters per second) lowers the apogee altitude of the satellite 10 to geosynchronous altitude. Also, an auxiliary burn (with a $\Delta V$ of 150.00 meters per second from a thrust vector oriented orthogonally to the plane of the earth return orbit 20 ) is used near a node of the earth return orbit 20 to further reduce inclination and further adjust the node, which places the satellite 10 in the final operational orbit 24. (These two final burn maneuvers are combined as a $\Delta V$ of 978.18 meters per second in Table I.) This allows the final operational orbit to be optimized (near 330 degrees) to use the gravity of the sun and the moon to gradually reduce the inclination of the final operational orbit 24 to zero over a time period of about fifteen years.

The present invention is directly applicable to a quasi-GTO having any given inclination, but is especially advantageous to a satellite launched in either March or September into a highly inclined quasi-GTO, because the lunar flyby is capable of removing all of the inclination. The invention can also be used as part of a routine backup mission plan for use in the event of a failed launch insertion on a high latitude rocket launch system, such as the Proton Rocket of the International Launch Services (ILS) Company. Such a backup mission plan can help to minimize insurance costs associated with a satellite launch.

The present invention has been described with reference to specific examples, which are intended to be illustrative only, and not to be limiting of the invention, as it will be apparent to those of ordinary skill in the art that changes, additions and/or deletions may be made to the disclosed embodiments without departing from the spirit and scope of the invention.

For example, as noted above, the invention may be used to take the inclination of a final geosynchronous orbit of a satellite to zero, resulting in a geostationary orbit, provided that the satellite is launched in March or September. This is because a satellite launched during March or September will cross the equatorial plane of the earth at the same time as the moon. Such a final orbit was not possible to achieve in the case of ASIASAT 3, because it was launched in December.

TABLE I

| ORBIT | ΔV (m/s) | SEMI-MAJOR AXIS (km) | ECCENTRICITY | INCLINATION (degrees) | MEAN ANOMALY (degrees) | ARGUMENT OF PERIGEE (degrees) | ASCENDING NODE (degrees) |
|---|---|---|---|---|---|---|---|
| INITIAL ORBIT | 0 | 24549.26 | 0.7227757 | 51.18475 | 0.0000 | 21.3074 | 66.0069 |
| PHASING ORBIT 1 | 55.11 | 26432.52 | 0.7424849 | 51.19871 | 0.0000 | 21.4288 | 65.8710 |
| PHASING ORBIT 2 | 55.57 | 28564.57 | 0.7617074 | 51.19868 | 0.0000 | 21.5103 | 65.7650 |
| PHASING ORBIT 3 | 57.15 | 31164.13 | 0.7815865 | 51.19865 | 0.0000 | 21.5902 | 65.6612 |
| PHASING ORBIT 4 | 58.19 | 34366.40 | 0.8019403 | 51.19859 | 0.0000 | 21.7462 | 65.4584 |
| PHASING ORBIT 5 | 59.25 | 38408.28 | 0.8227852 | 51.19856 | 0.0000 | 21.8225 | 65.3592 |
| PHASING ORBIT 6 | 60.38 | 43673.09 | 0.8441508 | 51.19854 | 0.0000 | 21.8971 | 65.2623 |
| PHASING ORBIT 7 | 61.54 | 50813.41 | 0.8660534 | 51.19848 | 0.0000 | 22.0428 | 65.0729 |
| PHASING ORBIT 8 | 62.76 | 61147.54 | 0.8891134 | 51.30985 | 0.0000 | 22.1241 | 65.0216 |
| PHASING ORBIT 9 | 61.93 | 76506.07 | 0.9113772 | 51.30980 | 0.0000 | 22.2627 | 64.8402 |
| PHASING ORBIT 10 | 66.60 | 105057.7 | 0.9354662 | 51.30975 | 0.0000 | 22.3982 | 64.6629 |
| PHASING ORBIT 11 | 65.74 | 166942.4 | 0.9593931 | 51.30972 | 0.0000 | 22.4644 | 64.5765 |
| TRANSLUNAR ORBIT | 22.74 | 213285.1 | 0.9684023 | 52.06270 | 0.0000 | 22.6275 | 64.7699 |
| EARTH RETURN ORBIT | 0 | 327997.5 | 0.8714367 | 18.07254 | 0.0000 | 67.0855 | 344.801 |
| GEOSYNCHRONOUS PERIGEE HOLDING ORBIT | 312.4 | 106440.9 | 0.603948 | 18.12739 | 0.0000 | 65.9104 | 346.3627 |
| FINAL GEOSYNCHRONOUS ORBIT | 978.2 | 42163.57 | 0.009607 | 12.53520 | 0.0000 | 256.8904 | 335.3047 |

What is claimed is:

1. A method for transferring a satellite from an initial orbit about the earth, the initial orbit having a first inclination, to a final geosynchronous orbit about the earth, the final geosynchronous orbit having a second inclination substantially lower than the first inclination, by using a lunar gravitation-assist flyby maneuver, the method comprising the steps of:

placing the satellite into the initial orbit about the earth, the initial orbit having an apogee substantially lower than lunar radius;

placing the satellite into a translunar orbit, the translunar orbit having an apogee near lunar radius;

placing the satellite into a lunar flyby maneuver near apogee of the translunar orbit, whereby the inclination of the orbit of the satellite with respect to the earth is significantly reduced;

placing the satellite into an earth-return orbit, the earth-return orbit having a perigee near geostationary radius; and placing the satellite into the final geosynchronous orbit about the earth.

2. The method of claim 1, wherein the step of placing the satellite into the translunar orbit comprises a step of placing the satellite into a series of phasing orbits, each phasing orbit having an apogee altitude higher than that of the previous phasing orbit.

3. A method for transferring a satellite from a quasi-geosynchronous transfer orbit, the quasi-geosynchronous transfer orbit having a first inclination, to a geosynchronous earth orbit, the geosynchronous orbit having a second inclination substantially lower than the first inclination, by using a lunar gravitation-assist flyby maneuver, the method comprising the steps of:

placing the satellite into the quasi-geosynchronous transfer orbit;

placing the satellite into a translunar orbit, the translunar orbit having an apogee near lunar radius;

placing the satellite into a lunar flyby maneuver whereby the inclination of the orbit of the satellite with respect to the earth is significantly reduced;

placing the satellite into an earth-return orbit, the earth-return orbit having a perigee near geostationary radius; and placing the satellite into the geosynchronous orbit about the earth.

4. The method of claim 3, wherein the step of placing the satellite into the translunar orbit comprises a step of placing the satellite into a series of phasing orbits, each phasing orbit having an apogee altitude higher than that of the previous phasing orbit.

* * * * *